US011891704B2

(12) United States Patent
Kim et al.

(10) Patent No.: US 11,891,704 B2
(45) Date of Patent: Feb. 6, 2024

(54) METHOD FOR PREVENTING CORROSION OF SPENT NUCLEAR FUEL CANISTER BY USING ELECTROLYTIC CORROSION PROTECTION

(71) Applicant: KOREA RADIOACTIVE WASTE AGENCY, Gyeongju-Si (KR)

(72) Inventors: Seung Hyun Kim, Sejong-si (KR); Min Seok Kim, Daejeon (KR); Sang Hwan Lee, Daejeon (KR); Chang Min Shin, Daejeon (KR); Hyung Ju Yun, Daejeon (KR); Man Ho Han, Daejeon (KR); Jeong Hwan Lee, Daejeon (KR); Chun Hyung Cho, Daejeon (KR)

(73) Assignee: KOREA RADIOACTIVE WASTE AGENCY, Gyeongju-si (KR)

( * ) Notice: Subject to any disclaimer, the term of this patent is extended or adjusted under 35 U.S.C. 154(b) by 281 days.

(21) Appl. No.: 17/288,268

(22) PCT Filed: Sep. 11, 2019

(86) PCT No.: PCT/KR2019/011785
§ 371 (c)(1),
(2) Date: Apr. 23, 2021

(87) PCT Pub. No.: WO2020/091221
PCT Pub. Date: May 7, 2020

(65) Prior Publication Data

US 2021/0388509 A1 Dec. 16, 2021

(30) Foreign Application Priority Data

Oct. 30, 2018 (KR) ........................ 10-2018-0131081
Oct. 30, 2018 (KR) ........................ 10-2018-0131136

(51) Int. Cl.
*C23F 13/14* (2006.01)
*C23F 13/22* (2006.01)
*G21F 5/008* (2006.01)

(52) U.S. Cl.
CPC .............. *C23F 13/14* (2013.01); *C23F 13/22* (2013.01); *G21F 5/008* (2013.01)

(58) Field of Classification Search
CPC .......... C23F 13/04; C23F 13/20; C23F 13/22; C23F 2213/10–2213/11; C23F 2213/31
See application file for complete search history.

(56) References Cited

U.S. PATENT DOCUMENTS 4,472,347 A * 9/1984 Quillmann ................ G21F 9/36 136/202
4,535,250 A 8/1985 Fields
(Continued)

FOREIGN PATENT DOCUMENTS

JP 59-199488 11/1984
JP 2008297600 A 12/2008
(Continued)

OTHER PUBLICATIONS

James et al ("Multi-barrier Borehole Canister Designs for a Tuff Repository", 1994, pp. 1-8) (Year: 1994).*
(Continued)

*Primary Examiner* — Alexander W Keeling
(74) *Attorney, Agent, or Firm* — Hauptman Ham, LLP

(57) ABSTRACT

A method for preventing corrosion of a spent nuclear fuel canister by using electrolytic corrosion protection, according to the present invention, has an effect of enabling a semi-permanent operation and, particularly, has effects of preventing oxidation and corrosion problems of a canister made of a metal material, in consideration of various environmental variables that may cause corrosion, and ensuring the
(Continued)

structural stability of the canister so as to enable a semi-permanent operation.

14 Claims, 5 Drawing Sheets

(56) References Cited

U.S. PATENT DOCUMENTS

| | | | | |
|---|---|---|---|---|
| 2010/0027380 | A1* | 2/2010 | Samuelson | G01V 1/181 367/188 |
| 2019/0010615 | A1* | 1/2019 | Whitmore | C23F 13/20 |

FOREIGN PATENT DOCUMENTS

| | | | |
|---|---|---|---|
| KR | 20010106042 | A | 11/2001 |
| KR | 102014967 | B1 | 8/2019 |
| KR | 102018255 | B1 | 9/2019 |

OTHER PUBLICATIONS

Cui et al ("Environmental behaviors of spent nuclear fuel and canister materials", Energy & Environmental Science, 2011, 4, pp. 2537-2545) (Year: 2011).*

Gummow et al ("An Alternative View of the Cathodic Protection Mechanism on Buried Pipelines", NACE Corrosion Conference & Expo, 2016) (Year: 2016).*

Padovani et al., C., "The corrosion behaviour of candidate container materials for the disposal of high-level waste and spent fuel—a summary of the state of the art and opportunities for synergies in future R&D," Corrosion Engineering, Science and Technology, vol. 52, No. S1, pp. 227-231, Aug. 23, 2017.

International Search Report issued in corresponding International Application No. PCT/KR2019/011785, dated Dec. 23, 2019, pp. 1-3, Korean Intellectual Property Office, Daejeon, Republic of Korea.

* cited by examiner

[FIG. 1]
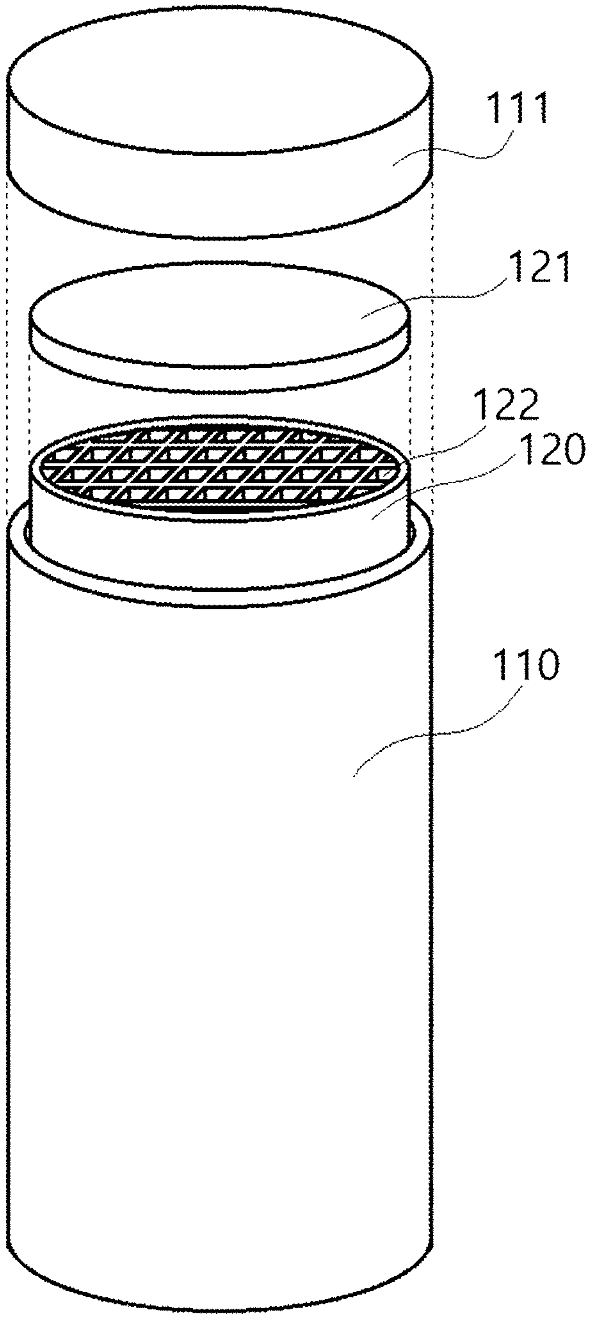

[FIG. 2]
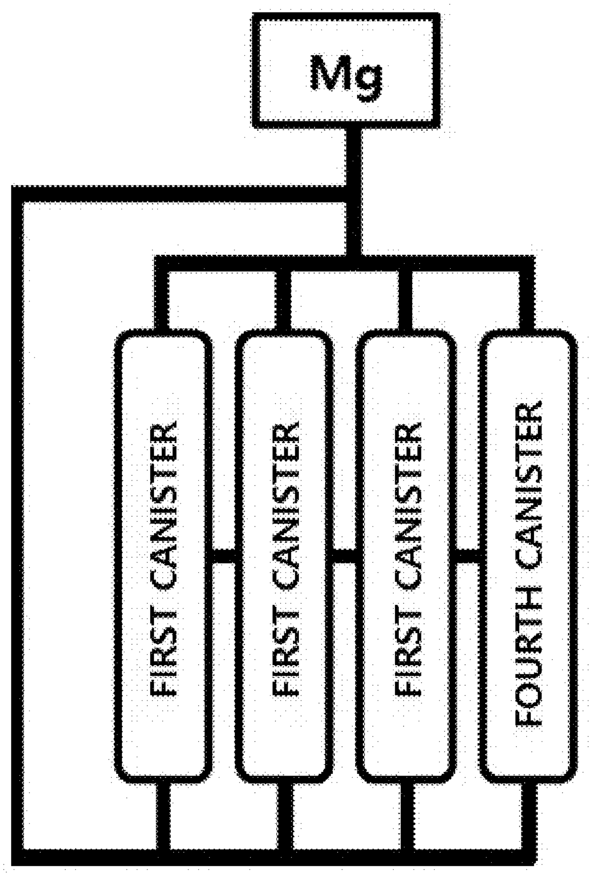

[FIG. 3]
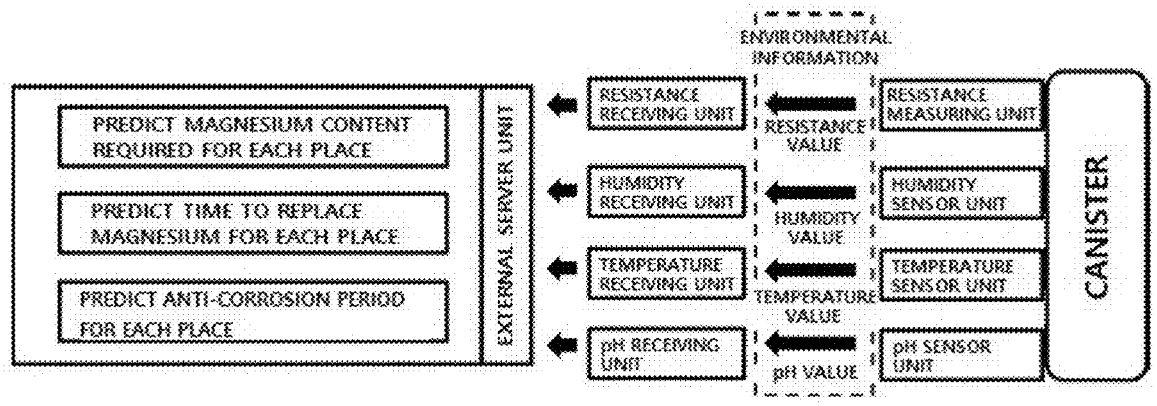

[FIG. 4]
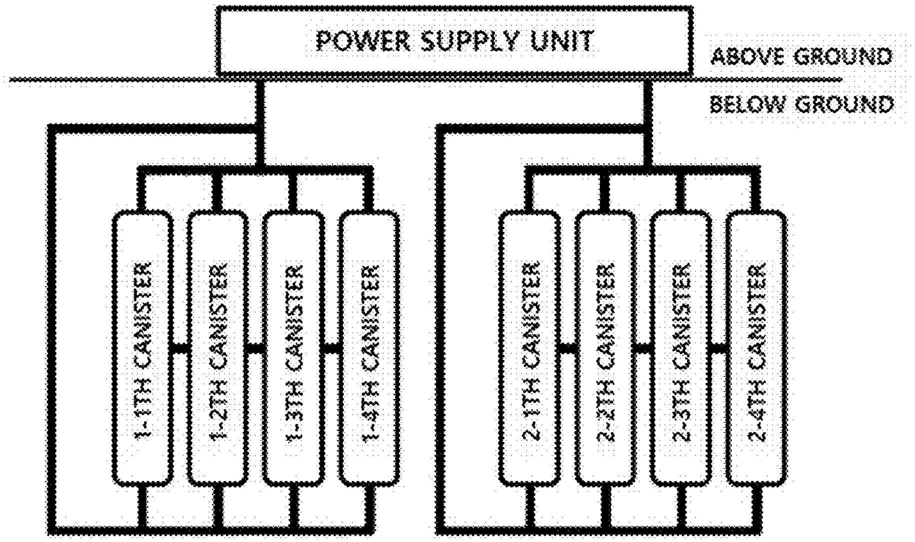
[FIG. 5]
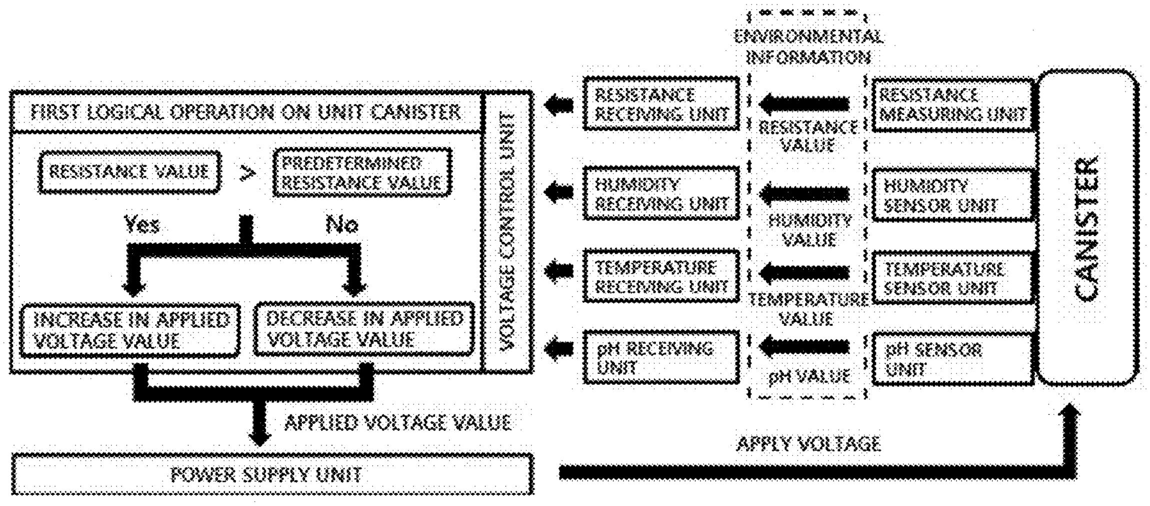

[FIG. 6]
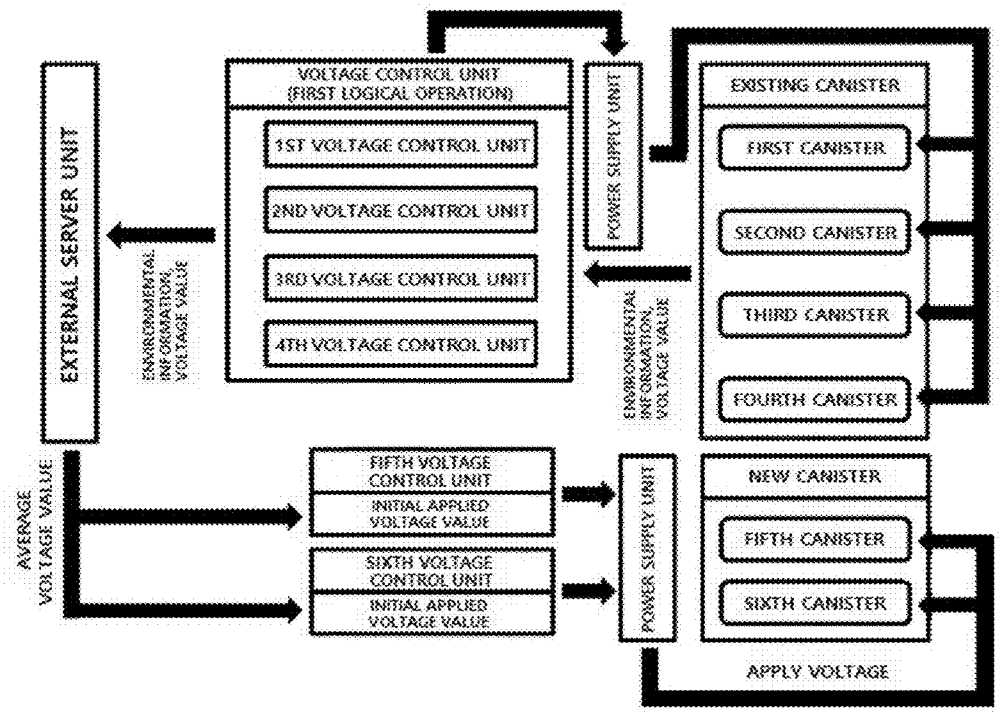
[FIG. 7]
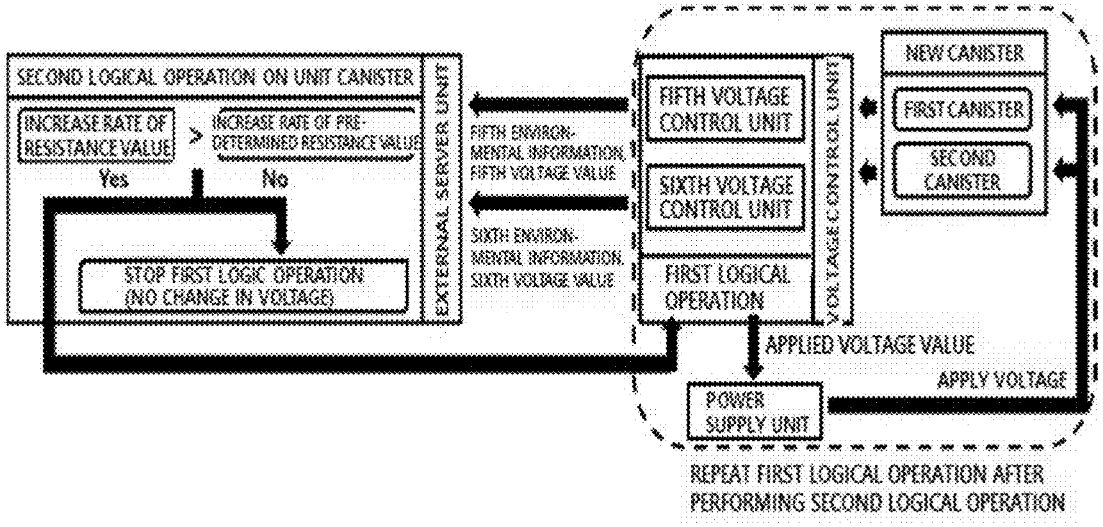

METHOD FOR PREVENTING CORROSION OF SPENT NUCLEAR FUEL CANISTER BY USING ELECTROLYTIC CORROSION PROTECTION

TECHNICAL FIELD

The present disclosure relates to a method for preventing corrosion of a spent nuclear fuel canister by using electrolytic corrosion protection and an application method thereof.

BACKGROUND ART

Nuclear waste, such as a high-level radioactive waste or a spent nuclear fuel, which is unavoidably occurring from nuclear power generation and industries, needs to be safely isolated from an ecosystem for a long period of time. A disposal container (canister), which is an engineering barrier for the isolation may usually be made of single material or alloy. France, the United Kingdom, Japan and the like consider a method in which the high-level waste is processed into glass solidified material, the material is put in the canister, and the canister is then packed in another canister. Canada, Germany, Finland, Sweden and the like consider a method in which the spent nuclear fuel is directly packaged in the canister. The United States considers separate disposal canisters for the two types of the glass solidified material and the spent nuclear fuel. The Republic of Korea considers a way to dispose of the spent nuclear fuel in a deep stratum. For example, the canister may be mounted vertically or horizontally in a deep crystalline bedrock having a depth of 500 m, and an area surrounding the canister may then be filled with compressed bentonite.

However, in the disposal cave built in the basement bedrock having the depth of 500 m or more to dispose of the canister containing the spent nuclear fuel as described above, there may be water pressure of 50 atm or more due to groundwater and swelling pressure of 100 atm or more due to buffering material to protect the canister. Therefore, the canister needs to ensure structural stability to withstand such a pressure. In addition, the canister needs to semi-permanently suppress a radionuclide present in the spent nuclear fuel from leaking into its surrounding environment.

Accordingly, various studies are necessary to prevent a problem caused by various corrosion environments that may come into contact with the groundwater and to ensure the long-term structural stability of the canister.

In detail, in order to safely isolate the nuclear waste contained in the canister from the ecosystem for a long period of time, it is necessary to fundamentally prevent corrosion of the canister. In particular, when the canister is made of metal material, the metal may be resistant to external impact and have excellent structural stability, but may be vulnerable to corrosion caused by its oxidation reaction. Accordingly, the canister made of the metal material and buried in the basement having a highly oxidizing environment may have a fatal problem in that the canister is unable to safely isolate the spent nuclear fuel from the ecosystem.

Therefore, in order to completely isolate the nuclear waste from the ecosystem, there is a need for a fundamental solution to the problem that the canister made of the metal material is oxidized and corroded.

DISCLOSURE

Technical Problem

An object of the present disclosure is to provide a method for preventing corrosion of a spent nuclear fuel canister, in which the canister may be semi-permanently operated by predicting a problem may occur from the canister in advance by not missing a time to replace its magnesium when a case, and an application method thereof.

A specific object of the present disclosure is to provide the method for preventing corrosion of a spent nuclear fuel canister, in which the canister may be semi-permanently operated by preventing the canister made of metal material from being oxidized and corroded in consideration of various environmental variables which may cause its corrosion, and by ensuring the canister to have structural stability, and an application method thereof.

Another specific object of the present disclosure is to provide the method for preventing corrosion of a spent nuclear fuel canister, in which the canister may be operated by having a minimized usage content of magnesium which is used to prevent the spent nuclear fuel canister from being oxidized, and the canister may be semi-permanently operated by still preventing the canister made of the metal material from being oxidized and corroded, and an application method thereof.

Another specific object of the present disclosure is to provide the method for preventing corrosion of a spent nuclear fuel canister, in which a spent nuclear fuel canister installed at a new place may also be operated by having the minimized usage content of the used magnesium based on data obtained from the spent nuclear fuel canister installed at an existing place, and the canister may be semi-permanently operated by still preventing the canister made of the metal material from being oxidized and corroded, and a system thereof.

Another specific object of the present disclosure is to provide the method for preventing corrosion of a spent nuclear fuel canister, in which a large-scale system including the plurality of canisters may be operated, and a system thereof.

Technical Solution

In one general aspect, a method for preventing corrosion of a spent nuclear fuel canister by using electrolytic corrosion protection includes: a nuclear fuel storage portion storing a spent nuclear fuel therein and including a unit canister made of metal material including at least one selected from copper and iron; and a sacrificial anode portion connected to the canister and including a magnesium metal, such that corrosion of the unit canister is prevented.

According to an exemplary embodiment of the present disclosure, the unit canister may include: an external protection canister made of copper metal material; and an internal canister made of iron metal material, positioned inside the external protection canister, and including a spent nuclear fuel accommodation space.

According to an exemplary embodiment of the present disclosure, the external protection canister may have a thickness of 5 mm or more.

According to an exemplary embodiment of the present disclosure, the method for preventing corrosion of a spent nuclear fuel canister by using electrolytic corrosion protection may further include a predicting step of predicting a magnesium content the unit canister needs, a time to replace the magnesium of the unit canister, or an anti-corrosion period of the unit canister from values stored in an external server unit constructing a database by accumulating and storing one or more values selected from the resistance value, humidity value, temperature value and pH value of the unit canister.

According to an exemplary embodiment of the present disclosure, the nuclear fuel storage portion may be buried in a basement.

According to an exemplary embodiment of the present disclosure, the sacrificial anode portion may be positioned in a place where the magnesium metal may be replaced, and positioned to be spaced apart from or adjacent to the unit canister.

According to an exemplary embodiment of the present disclosure, the method for preventing corrosion of a spent nuclear fuel canister by using electrolytic corrosion protection may include: a metal oxidation content monitoring step of measuring a consumption content of the magnesium metal in the sacrificial anode portion; and a replacement time calculating step of predicting the time to replace the magnesium metal based on information obtained from the metal oxidation content monitoring step.

According to an exemplary embodiment of the present disclosure, the method for preventing corrosion of a spent nuclear fuel canister by using electrolytic corrosion protection may further include: the replacement time calculating step of predicting the time to replace the magnesium metal based on the information obtained from the replacement time calculating step and the predicting step.

According to an exemplary embodiment of the present disclosure, the method for preventing corrosion of a spent nuclear fuel canister by using electrolytic corrosion protection may further include: a step of replacing magnesium metal based on the information on the time to replace the magnesium metal, which is obtained from the replacement time calculating step.

According to an exemplary embodiment of the present disclosure, the method for preventing corrosion of a spent nuclear fuel canister by using electrolytic corrosion protection may further include: a checking step of checking whether an error occurs from an electric method applied to the unit canister based on change in the resistance value, the resistance value being included in the values stored in the external server unit in the predicting step.

According to an exemplary embodiment of the present disclosure, the method for preventing corrosion of a spent nuclear fuel canister by using electrolytic corrosion protection may include: a resistance measuring unit measuring the resistance value of the unit canister; and a resistance receiving unit receiving the resistance value from the resistance measuring unit in real time, wherein the external server unit may receive the resistance value from the resistance receiving unit.

According to an exemplary embodiment of the present disclosure, the method for preventing corrosion of a spent nuclear fuel canister may include: a humidity measuring unit measuring the humidity value of the unit canister; and a humidity receiving unit receiving the humidity value from the humidity measuring unit in real time, wherein the external server unit may receive the humidity value from the humidity receiver.

According to an exemplary embodiment of the present disclosure, the method for preventing corrosion of a spent nuclear fuel canister may include: a temperature measuring unit measuring the temperature value of the unit canister; and a temperature receiving unit receiving the temperature value from the temperature measuring unit in real time, wherein the external server unit may receive the temperature value from the temperature receiving unit.

According to an exemplary embodiment of the present disclosure, the method for preventing corrosion of a spent nuclear fuel canister may include: a pH measuring unit measuring the pH value of the unit canister; and a pH receiving unit receiving the pH value from the pH measuring unit in real time, wherein the external server unit may receive the pH value from the pH receiving unit.

According to an exemplary embodiment of the present disclosure, the method for preventing corrosion of a spent nuclear fuel canister may include the power supply unit applying a voltage to the unit canister as an applied voltage value, such that the corrosion of the unit canister is prevented.

According to an exemplary embodiment of the present disclosure, the method for preventing corrosion of a spent nuclear fuel canister may further include a voltage control unit performing a first logical operation in which the applied voltage value may be increased when the resistance value of the unit canister is more than a predetermined resistance value, and the applied voltage value may be decreased when the resistance value is less than the predetermined resistance value.

According to an exemplary embodiment of the present disclosure, the method for preventing corrosion of a spent nuclear fuel canister by using electrolytic corrosion protection may include an external server unit receiving the information from the voltage control unit, and storing an average voltage value obtained by statistically calculating the respective applied voltage values applied to the unit canisters, wherein the external server unit may control the voltage control unit to make the applied voltage value applied to the installed unit canister or the unit canister installed in a new place be the average voltage value, and may perform a second logical operation in which the voltage control unit is controlled to stop the first logical operation when an increase rate of the resistance value of the unit canister is less than or equal to a predetermined increase rate of the resistance value, and the voltage control unit is controlled to perform the first logical operation again when the increase rate of the resistance value is more than the predetermined increase rate of the resistance value.

According to an exemplary embodiment of the present disclosure, the nuclear fuel storage portion may include the plurality of unit canisters.

Advantageous Effects

According to a method for preventing corrosion of a spent nuclear fuel canister according to an exemplary embodiment of the present disclosure and an application method thereof, the canister may be semi-permanently operated by not missing time to replace its magnesium to predict a case in which a problem may occur from the canister in advance.

In detail, according to a method for preventing corrosion of a spent nuclear fuel canister according to an exemplary embodiment of the present disclosure and an application method thereof, the canister may be semi-permanently operated by preventing the canister made of metal material from being oxidized and corroded in consideration of various environmental variables which may cause its corrosion, and by ensuring the canister to have structural stability.

In addition, according to a method for preventing corrosion of a spent nuclear fuel canister according to an exemplary embodiment of the present disclosure and an application method thereof, the canister may be operated by having a minimized usage content of magnesium which is used to prevent the spent nuclear fuel canister from being oxidized, and the canister may be semi-permanently operated by still preventing the canister made of the metal material from being oxidized and corroded.

In addition, according to a method for preventing corrosion of a spent nuclear fuel canister according to an exemplary embodiment of the present disclosure and an application method thereof, a spent nuclear fuel canister installed at a new place may also be operated by having the minimized usage content of the used magnesium based on data obtained from the spent nuclear fuel canister installed at an existing place, and the canister may be semi-permanently operated by still preventing the canister made of the metal material from being oxidized and corroded.

In addition, according to a method for preventing corrosion of a spent nuclear fuel canister according to an exemplary embodiment of the present disclosure and an application method thereof, the large-scale system including the plurality of canisters may be operated.

Even if not explicitly mentioned in the present disclosure, an effect described in the specification as expected by a technical feature of the present disclosure and an inherent effect thereof need to be considered as described in the present specification.

Therefore, according to a method for preventing corrosion of a spent nuclear fuel canister according to an exemplary embodiment of the present disclosure and an application method thereof, the canister may be operated by using a minimum required content of the metal of the sacrificial anode portion; although installed in a new place and there is insufficient data on that place, even the plurality of canisters positioned at different places may be semi-permanently operated by replacing the sacrificial anode portion metal; and a problem that a corrosion prevention system of the plurality of unit canisters does not work may be solved even if a problem occurs in an upper wiring connected to the plurality of unit canisters.

In addition, according to a method for preventing corrosion of a spent nuclear fuel canister according to an exemplary embodiment of the present disclosure and an application method thereof, energy required for voltage application may be minimized while continuously maintaining the corrosion prevention by applying the voltage only to the unit canister to which the sacrificial anode method is not properly applied, rather than constantly applying the voltage to the unit canisters.

In addition, according to a method for preventing corrosion of a spent nuclear fuel canister according to an exemplary embodiment of the present disclosure and an application method thereof, an appropriate usage content of the magnesium metal of the plurality of canisters installed at a new place may be calculated, and an anti-corrosion period and the time to replace the magnesium may be precisely predicted, through the measured values of humidity, temperature and pH.

DESCRIPTION OF DRAWINGS

FIG. 1 is a view showing a canister according to the present disclosure.

FIG. 3 shows a method for preventing corrosion of a spent nuclear fuel canister according to the present disclosure, and shows the method for preventing its corrosion by predicting a magnesium content required for each place, by predicting a time to replace the magnesium for each place, and by predicting a corrosion prevention period for each place.

FIGS. 2 and 4 each show a conceptual structure in which a plurality of unit canisters according to the present disclosure are connected to each other.

FIGS. 5 to 7 are views showing a concept in which the spent nuclear fuel canister is prevented from being corroded by a first logical operation and/or a second logical operation according to the present disclosure.

BEST MODE

Hereinafter, a method for preventing corrosion of a spent nuclear fuel canister by using electrolytic corrosion protection is described in detail with reference to the accompanying drawings.

The drawings accompanying the specification are illustratively introduced to provide complete understanding of the scope and spirit of the prevention invention. Therefore, the present invention is not limited to the accompanying drawings provided below, but may be modified in many different forms. In addition, the accompanying drawings suggested below will be exaggerated in order to clear the spirit and scope of the present invention.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

The singular form of a term used in the present specification may be interpreted as including its plural form unless otherwise indicated.

Unless otherwise indicated, a unit of % used in the present specification may indicate % by weight.

In a first aspect, the method for preventing corrosion of a spent nuclear fuel canister by using electrolytic corrosion protection according to the present disclosure may include: a nuclear fuel storage portion storing a spent nuclear fuel therein and including a unit canister made of metal material including at least one selected from copper and iron; and a sacrificial anode portion connected to the canister and including a magnesium metal, thereby preventing corrosion of the unit canister. As the present disclosure uses a sacrificial anode method, electrons may be continuously supplied from the magnesium metal to the metal material to allow the unit canister made of the metal material to maintain a deoxidized state. Therefore, it is possible to minimize the corrosion of the unit canister due to oxidation of the metal material even when its surrounding environment is a highly oxidizing environment. Here, the metal material may further include a non-metal element such as carbon or nitrogen.

The nuclear fuel storage portion may include the unit canister.

As shown in FIG. 1, the unit canister may include: an external protection canister made of first metal material; and an internal canister made of second metal material, positioned inside the external protection canister, and including a spent nuclear fuel accommodation space.

The first metal material may include copper, and the second metal material may include iron. A canister made of iron material may have an excellent mechanical property, and may thus be resistant to impact and have excellent structural stability. However, the iron canister may be relatively more susceptible to its corrosion caused by the oxidation, and a canister made of copper material may be relatively less susceptible to its corrosion caused by the oxidation. Therefore, the iron canister having the excellent structural stability may be positioned inside the copper canister which is less susceptible to its corrosion. Therefore, the iron canister may not be directly exposed to an external oxidizing environment, thereby further improving its structural stability and suppressing its corrosion caused by the oxidation. As a preferred example, the canister may include: the external protection canister made of the copper metal material; and the internal canister made of the iron metal material, positioned inside the external protection canister, and including the spent nuclear fuel accommodation space. However, the description describes this configuration only as the preferred example, and the present disclosure is not limited thereto.

The external protection canister may be thick enough to ensure the required structural stability or more. For example, the external protection canister may have a thickness of 5 mm or more, specifically 5 to 50 mm, and more specifically 5 to 20 mm. However, the description describes this thickness only as the preferred example, and the present disclosure is not limited thereto.

The spent nuclear fuel accommodation space may be a space for accommodating the spent nuclear fuel, and may have various structures in which the spent nuclear fuel may be accommodated. For example, the space may be partitioned by a partition wall, and one or more or the plurality of spent nuclear fuels may thus be accommodated therein. Here, the sizes and shapes of the partition wall and the partitioned space may be appropriately adjusted by a person skilled in the art, and are thus not limited.

The external protection canister may include an external opening and closing portion that allows the spent nuclear fuel to be accommodated and sealed therein. As shown in FIG. 1, the spent nuclear fuel may fill the space inside the internal canister, and an internal opening and closing portion may be coupled to the internal canister to completely seal the internal canister. In addition, the internal canister may be accommodated in a space inside the external protection canister, and the external opening and closing portion may be coupled to the external protection canister to completely seal the external protection canister. The double-sealed canister may be buried in a basement or in a place such as a cave, and the spent nuclear fuel may thus be substantially blocked from an ecosystem. Here, the coupling may be achieved by using various sealing means that prevent a liquid such as water and a gas such as water vapor and oxygen from flowing into the canister, by using a welding means as a preferred example.

As a specific example of the nuclear fuel storage portion, i.e., the position of the unit canister, the canister may be positioned (buried) in a place that may be easily blocked from the ecosystem such as an undersea tunnel, a basement, a cave, a natural satellite, a planet other than Earth, an asteroid, a comet, a star, and a giant meteorite. The position of the canister is not limited as it is possible to select various places that may isolate the canister from the ecosystem. In addition, there are various known transport methods for positioning the canister, and it is possible to refer thereto. As a preferred example, the canister may be buried in the basement. In addition, there are various known transport methods for positioning the canister, and it is possible to refer thereto.

An anti-oxidation effect of the canister using the sacrificial anode portion may not be realized when the magnesium metal in the sacrificial anode portion is highly oxidized and its ability to provide the electrons is thus lost or decreased. Therefore, the magnesium metal may need to be replaced after a predetermined period of time. Accordingly, the sacrificial anode portion may be positioned to be spaced apart from or adjacent to the canister, may specifically be positioned above or below the ground, and may preferably be positioned in a place where the magnesium metal may be easily replaced. For example, the sacrificial anode portion may be positioned away from the canister and is easily accessible to the outside because when the above unit canister is buried in the basement, the basement burying the canister is disconnected from the outside, thereby making it difficult for a supply to enter. As a preferred example, when the sacrificial anode portion is positioned above the ground, the magnesium metal may be easily replaced. As a non-limiting example, when the sacrificial anode portion is positioned adjacent to the basement together with the canister, it is possible to fundamentally prevent a problem caused by a human intrusion. In this case, a maximum usage amount of the magnesium metal may be used practically so that it is not necessary to practically replace the magnesium metal. The maximum usage amount may be calculated by the magnesium content the unit canister needs, which is calculated in a predicting step described below.

As shown in FIG. 2, the nuclear fuel storage portion may include the unit canister, and the plurality of unit canisters may exist. The plurality of unit canister multiple unit canisters may be positioned at one place or at different places. Similarly, the sacrificial anode portion connected to the unit canister may also include the plurality of unit sacrificial anode portions, and the plurality of unit sacrificial anode portions may be positioned at one place or at different places.

The unit canister may be connected to the sacrificial anode portion in various ways, and as shown in FIG. 2, the unit canisters may preferably be connected in parallel with each other to be connected to the sacrificial anode portion. The above connection may be made by various materials through which electricity may flow, and for example, the connection may be made through a wire such as a copper wire or an iron wire. In addition, the canister and the sacrificial anode portion may be connected to each other through a single wire. In addition, the canister and the sacrificial anode portion may be connected to each other through two or more wires such as a double wire to minimize a probability in which electronic supply is cut off because the wire is disconnected due to external shock, poor weather resistance, etc. Here, the connection may be made by allowing the two or more wires to be connected in parallel with each other.

The sacrificial anode portion is not significantly limited because a variety of magnesium metals may be used as long as the magnesium metal may supply the electrons to the canister. However, it is preferable that the space in which the magnesium metal is positioned is a space from which material that takes electrons is excluded except for the canister. As a specific example, a closed space may be preferable from which an oxidizing agent such as $O_2$, $O_3$ or $H_2O$ may be excluded. To this end, the sacrificial anode portion may be the sealed canister from which the oxidizing agent is excluded and which is filled with the magnesium metal. Here, the magnesium metal may be connected to the canister through the wire.

As described above, the sacrificial anode method may be used for the method for preventing corrosion of a spent nuclear fuel canister by using electrolytic corrosion protection according to the present disclosure. Therefore, the electrons may be continuously supplied to the metal material of the canister to allow the canister to maintain the deoxidized state as long as the magnesium metal continuously supplies the electrons to the metal material of the canister. Therefore, it is possible to minimize the corrosion of the canister due to the oxidation of the metal even when its surrounding environment is a highly oxidizing environment.

However, this effect is possible when the magnesium metal in the sacrificial anode portion may continuously supply the electrons, and it thus needs a precondition in which the magnesium metal continuously supplies the electrons. However, the above precondition may be broken by various variables in reality. Accordingly, in the prior art, an excessive content of the magnesium metal is inevitable, and it is difficult to use the minimum amount of the magnesium, which is suitable for the surrounding environment of the canister.

Accordingly, the present disclosure provides the method for semi-permanently preventing corrosion of a spent nuclear fuel canister, in which the canister may realize the effect of preventing its corrosion, the canister may be prevented from being oxidized or corroded for a required period, and the magnesium metal may be replaced in a timely manner in preparation for the problem that the canister is oxidized.

Corrosion of the metal material of the canister may significantly depend on the surrounding environment. In detail, the oxidation of the metal material may be greatly affected by the surrounding environment such as humidity, temperature and pH. That is, when the metal material of the canister is oxidized and corroded, electrical resistance of the metal material may be increased, and an oxidation rate of the metal material may be increased or decreased based on the surrounding environment. However, it is practically impossible to fundamentally exclude such an oxidizing environment, and it is also practically impossible to control an oxidation factor such as a humidity value, a temperature value and a pH value. In addition, for example, the sacrificial anode portion may be positioned far away from the canister, and a content of electrons supplied to the canister per unit time may thus have a reduced value than a theoretical value due to resistance of the wire. In addition, the wires connecting the sacrificial anode portion and the canister to each other may become deteriorated over time to be disconnected from each other, and the corrosion problem may thus be accelerated over time.

Therefore, as shown in FIG. 3, the method for preventing corrosion of a spent nuclear fuel canister by using electrolytic corrosion protection according to the present disclosure may further include the predicting step of predicting the magnesium content the unit canister needs, the time to replace the magnesium of the unit canister, or an anti-corrosion period of the unit canister from values stored in an external server unit constructing a database by accumulating and storing one or more values selected from the resistance value, humidity value, temperature value and pH value of the unit canister.

In detail, in the predicting step, as an example of a method for predicting the time to replace the magnesium of the unit canister, the method for preventing corrosion of a spent nuclear fuel canister by using electrolytic corrosion protection according to the present disclosure may include a metal oxidation content monitoring step of measuring a consumption content of the magnesium metal in the sacrificial anode portion; and a replacement time calculating step of predicting the time to replace the magnesium metal based on information obtained from the metal oxidation content monitoring step. In addition, the method may further include the replacement time calculating step of predicting the time to replace the magnesium metal based on the information obtained from the replacement time calculating step and the predicting step.

In addition, the method for preventing corrosion of a spent nuclear fuel canister according to an exemplary embodiment of the present disclosure may further include a checking step of checking whether an error occurs from an electric method applied to the unit canister based on change in the resistance value included in the values stored in the external server unit in the predicting step. The surrounding environment of the canister may affect a degree of the corrosion of the metal material of the canister, and therefore, the more the metal material is oxidized, the more resistance value the metal material of the canister has. Therefore, it is possible to measure and obtain the resistance value of the metal material of the unit canister in real time, and monitor the actual degree of oxidation and corrosion of the canister based on the resistance value, thereby preventing acceleration of the corrosion due to the variable that may occur afterwards. For example, it is possible to timely detect a fatal problem in which the portion connecting the unit canister and the sacrificial anode portion to each other is disconnected or the like, and establish a measure, thereby providing the method for semi-permanently preventing corrosion of a spent nuclear fuel canister. In addition, through the above checking step, it is also possible to timely detect a fatal problem in which a portion connecting the unit canister and a power supply unit to each other is disconnected or the like, in one aspect to which an external power method described below is applied, thereby making it possible to prevent the corrosion of the canister through the semi-permanent electrolytic corrosion protection.

As shown in FIG. 3, the external server unit may construct its database by accumulating various environmental information such as the humidity value, the temperature value and the pH value, as well as the resistance value of the metal material of the canister, which is measured in real time. Therefore, by using this information, it is possible to accurately calculate and predict the magnesium content the unit canister needs, the time to replace the magnesium of the unit canister, or the anti-corrosion period of the unit canister, in the predicting step. In particular, it is possible to quantitatively monitor the degree of corrosion of the unit canister based on each position, and thus possible to accurately predict the time to replace the magnesium metal and the anti-corrosion period.

As a specific example, the method may include: a resistance measuring unit measuring the resistance value of the unit canister; and a resistance receiving unit receiving the resistance value from the resistance measuring unit in real time, wherein the external server unit may receive the resistance value from the resistance receiving unit.

Various types of resistance measuring units may be used as long as the unit measures the resistance value of the metal material of the external protection canister, may be used referring to the known art, and there is no limitation thereon. In addition, the resistance receiving unit may be positioned adjacent to the unit canister, or may be positioned in another place away from the canister, e.g., on the ground. Here, the resistance receiving unit may be connected to the resistance measuring unit through the wire or the like.

As described above, the method for preventing corrosion of a spent nuclear fuel canister according to an exemplary embodiment of the present disclosure may accurately predict the time to replace the magnesium metal and the anti-corrosion period through the measurement of the resistance value. In addition, the method may timely obtain the environmental information such as the resistance value, the temperature value, the humidity value and the pH value by measuring the environmental variables such as the temperature, ambient humidity and ambient pH of the canister. In this manner, it is possible to more accurately predict each anti-corrosion period of the canisters positioned at different places and the time to replace the magnesium metal of each canister by statistically calculating the values based on various environmental information.

The method for preventing corrosion of a spent nuclear fuel canister according to an exemplary embodiment of the present disclosure may include: a humidity measuring unit measuring the humidity value of the unit canister; and a humidity receiving unit receiving the humidity value from the humidity measuring unit in real time, wherein the external server unit may receive the humidity value from the humidity receiver. As the humidity is a very effective factor accelerating the oxidation of the metal material, the oxidation of metal material may rapidly occur at predetermined humidity or above. Therefore, the resistance value of the metal material may significantly depend on change in the humidity. Therefore, it is possible to more accurately predict each anti-corrosion period of the canisters positioned at different places and the time to replace the magnesium metal of each canister by statistically calculating the values based on the environmental information including the humidity together with the resistance value.

The method for preventing corrosion of a spent nuclear fuel canister according to an exemplary embodiment of the present disclosure may include: a temperature measuring unit measuring the temperature value of the unit canister; and a temperature receiving unit receiving the temperature value from the temperature measuring unit in real time, wherein the external server unit may receive the temperature value from the temperature receiving unit. As the temperature is an effective factor accelerating the oxidation of the metal material, the higher the temperature, the higher a water vapor pressure. Therefore, the contact time and contact content between the metal material and $H_2O$ may be increased to cause the faster oxidation of the metal material. Accordingly, the resistance value of the metal material may significantly depend on change in the temperature. Therefore, it is possible to more accurately predict each anti-corrosion period of the canisters positioned at different places and the time to replace the magnesium metal of each canister by statistically calculating the values based on the environmental information including the temperature together with the resistance value.

The method for preventing corrosion of a spent nuclear fuel canister according to an exemplary embodiment of the present disclosure may include: a pH measuring unit measuring the pH value of the unit canister; and a pH receiving unit receiving the pH value from the pH measuring unit in real time, wherein the external server unit may receive the pH value from the pH receiving unit. As the pH is another effective factor accelerating the oxidation of the metal material, the oxidation of the metal material may be accelerated or slowed depending on a range of the surrounding pH. Accordingly, the resistance value of the metal material may significantly depend on change in the surrounding pH. Therefore, it is possible to more accurately predict each anti-corrosion period of the canisters positioned at different places and the time to replace the magnesium metal of each canister by statistically calculating the values based on the environmental information including the surrounding pH together with the resistance value. The pH may refer to the pH of the surroundings including liquid, solid or gas, existing outside the canister, and may indicate the pH of a basement soil in contact with an outer surface of the canister when the canister is buried in the basement.

As described above, the external server unit may construct the database by accumulating and storing the resistance value, the humidity value, the temperature value, and the pH value, and in detail, the database may be constructed by accumulating and storing each valued for each time. In addition, the position of the external server unit is not significantly limited. However, the external server unit may preferably be positioned away from the canister, specifically on the ground.

By statistically calculating the values based on the database, when the canister is installed in a new place having information yet to be obtained or having no relevant information, it is possible to calculate and predict the appropriate usage content of the magnesium metal, the anti-corrosion period and the time to replace the magnesium even in a case where a value of the corresponding place does not exist or is not accumulated enough. It is impossible to infinitely accommodate the canister filled with the spent nuclear fuel at one place. Accordingly, as long as mankind uses nuclear fuel-based technology, a new unit canister to be newly positioned may thus be continuously generated and the above new place may also be continuously established.

Therefore, the present disclosure may also provide a method of installing a spent nuclear fuel canister in a new place and operating the canister at a minimum cost.

The method of installing a spent nuclear fuel canister in a new place according to an exemplary embodiment of the present disclosure may include: a step of predicting the minimum usage content of the magnesium metal based on the anti-corrosion period required for each place in which the canister is installed; a step of installing the sacrificial anode portion by applying the minimum usage content of the magnesium metal; and a step of installing the canister, through the above method for preventing corrosion of a spent nuclear fuel canister by using electrolytic corrosion protection. As a preferred example, the step of installing the spent nuclear fuel canister may be a step of embedding the spent nuclear fuel canister in the basement. In this manner, when the canister and/or the sacrificial anode portion are/is also installed in a new place, it is possible to operate the canister effectively and efficiently even though the database including the environmental information on the new place is not initially constructed, or while minimizing the cost required for this construction. It is also possible to more precisely calculate and predict the value by constructing the database of the new place afterwards.

Further, when the database is constructed by sufficiently ensuring each datum, it is possible to safely and semi-permanently isolate the nuclear fuel storage portion including the unit canister from the ecosystem without the corrosion of the canister more stably, efficiently and effectively through deep learning using the accumulated data.

In a second aspect, the method for preventing corrosion of a spent nuclear fuel canister by using electrolytic corrosion protection according to the present disclosure may further include the power supply unit applying a voltage to the unit canister an applied voltage value, thereby further preventing the corrosion of the unit canister to more stably provide a method for semi-permanently operating the canister. As the present disclosure according to the second aspect uses the external power method (impressed current method) along with the sacrificial anode method, the electrons may be continuously supplied to the metal material through the voltage application, thereby allowing the canister to maintain the deoxidized state more stably. Therefore, it is possible to effectively prevent the corrosion of the canister caused by the oxidation of the metal even when the surrounding environment of the canister is the highly oxidizing environment.

The power supply unit may be positioned to be spaced apart from the canister. The position of the power supply unit is not significantly limited as long the position is a place where the power supply unit uses electric energy. However, the power supply unit may preferably be positioned on the ground. In addition, the power supply unit may include the plurality of unit power supplies connected to respective unit canisters, and the plurality of unit power supplies may be positioned at one place or at different places.

The unit canister may be connected to the power supply unit in various ways, and as shown in FIG. 4, the unit canisters may be preferably connected in parallel with each other to be connected to the power supply unit. As a specific example, the plurality of unit canisters connected to the unit power supply unit may be connected in parallel with each other with respect to the unit power supply unit. The above connection may be made through various materials through which electricity may flow, and for example, the connection may be made through the wire such as the copper wire or the iron wire. In addition, the canister and the power supply unit may be connected to each other through a single wire. In addition, the canister and the power supply unit may be connected to each other through two or more wires such as a double wire to minimize a probability in which the voltage application is cut off because the wire is disconnected due to external shock, poor weather resistance, etc. Here, the connection through the double wire may be made by allowing the two or more wires to be connected in parallel with each other.

The power supply unit may include a direct current (DC) supply device, and is not limited thereto because the power supply unit may use various methods as long as the power supply unit supplies the electrons to the canister. In addition, a specific value such as the voltage or current applied from the power supply unit may be varied by various variables such as the surrounding environment of the canister and the type of the metal material of the canister. The value may also be appropriately adjusted by a person skilled in the art through a first logical operation or a second logical operation, which are described below. Therefore, the value is not particularly limited to an absolute numerical value.

As described above, the method for preventing corrosion of a spent nuclear fuel canister according to the second aspect uses the external power method, thereby fundamentally preventing the corrosion of the canister caused by the oxidation of the metal. However, the effect of the external power method is only when the minimum or higher voltage required to prevent the metal material of the canister from being oxidized is continuously applied from the power supply unit. That is, it needs a precondition in which the voltage sufficiently exceeding the required minimum voltage is supplied to the canister. However, in reality, the voltage significantly exceeding the required minimum voltage needs to be continuously supplied to significantly consume the electrical energy.

In general, the power source of the power supply unit may be positioned far away from the canister, and a voltage drop may occur in which the voltage applied to the canister is decreased than the voltage applied from the power supply unit. Therefore, a difference may occur between the voltage applied from the power supply unit and the voltage actually applied to the canister. In addition, the wires connecting the power supply unit and the canister to each other may become deteriorated over time, and a degree of the voltage drop may be accelerated over time. In particular, this voltage drop may occur more significantly when the power source is a DC power source.

To solve this problem, the method for preventing corrosion of a spent nuclear fuel canister according to a second aspect may control the voltage actually applied to the canister based on the information obtained from the external server unit such as the resistance value, thereby continuously reflecting the required minimum voltage varied based on the surrounding environment which is changed in real time, to the canister. In addition, it is possible to reflect the difference between the voltage applied to the power supply unit and the voltage applied to the canister caused by the voltage drop occurring due to a distance in which the power supply unit and the canister are spaced apart from each other, thereby minimizing the consumed electric energy. Therefore, the present disclosure according to a second aspect may overcome the problem occurring due to the voltage drop, and maintain the power supplied to the canister to be consumed to a degree close to the minimum power consumption in which the canister is not corroded.

As shown in FIG. 5, the method for preventing corrosion of a spent nuclear fuel canister according to a second aspect may further include a voltage control unit performing the first logical operation in which the applied voltage value may be increased when the resistance value of the unit canister is more than a predetermined resistance value, and the applied voltage value may be decreased when the resistance value is less than the predetermined resistance value.

In detail, the voltage applied to the canister may be varied by the voltage control unit. As described above, the surrounding environment of the canister may affect the degree to which the metal material of the canister is corroded, and therefore, the more the metal material is oxidized, the more resistance value the metal material of the canister has. In addition, even if the oxidation of the metal material does not proceed, a minimum resistance value required for preventing the oxidation may be changed as the surrounding environment of the canister is changed. Therefore, it is possible to timely measure the resistance value of the metal material of the canister, which may be changed in real time, and perform a logic operation comparing the predetermined resistance value and the resistance value, which are selected based on this measurement, thereby maintaining the power supplied to the canister to be consumed to a degree close to the minimum power consumption in which the canister is not corroded. Various types of voltage control units may be used as long as the unit performs the logical operation and may be used referring to the known art, and there is no limitation thereon.

In addition, in the first logical operation, the resistance value may be a value corrected by the values for the surrounding environment such as the humidity, temperature and pH of the external server. The minimum power consumption of each unit canister may depend on the surrounding environment. Therefore, the minimum power consumption in which none of the unit canisters positioned at different places is corroded may be different even when the unit canisters have the same specification. Accordingly, the first logical operation may be performed on the measured resistance value of each unit canister by comparing the corrected value depending on each surrounding environment and the predetermined resistance value to each other.

That is, in the first logical operation, it is possible to reflect the values statistically calculated based on the environmental information such as the resistance value, the temperature value, the humidity value and the pH value. In this manner, it is possible to calculate the minimum voltage in which the metal material is prevented from being corroded, and set the predetermined resistance value to be close to a value exceeding the voltage in which the corrosion is prevented based on the calculated voltage. Therefore, it is possible to control the actual voltage applied to the canister to be minimized, thereby continuously reflecting the required minimum voltage which is varied based on the surrounding environment that is changed in real time. That is, the present disclosure may maintain the power supplied to the canister to be consumed to a degree closer to the minimum power consumption in which the canister is not corroded.

As a specific example, when the received humidity value exceeds a predetermined humidity value, the voltage control unit may use a corrected predetermined resistance value in which the humidity value reflects the predetermined resistance value. Here, the predetermined humidity value may refer to a minimum value that may substantially affect prevention of the corrosion of the canister caused by the significant oxidation. This value may be calculated based on the database including the surrounding environment, the voltage applied value, the resistance value and the like, and appropriately selected by a person skilled in the art. The humidity is the very effective factor accelerating the oxidation of the metal material, and the oxidation of metal material may rapidly occur at the predetermined humidity or above. Therefore, the resistance value of the metal material may significantly depend on change in the humidity. Therefore, when the predetermined resistance value is calculated based on the environmental information including the humidity, it is possible to operate a system using the voltage closer to the required minimum resistance value in which the metal material is prevented from being corroded.

As a specific example, when the received temperature value exceeds a predetermined temperature value, the voltage control unit may use a corrected predetermined resistance value in which the temperature value reflects the predetermined resistance value. Here, the predetermined temperature value may refer to a minimum value that may substantially affect prevention of the corrosion of the canister caused by the significant oxidation. This value may be calculated based on the database including the surrounding environment, the voltage applied value, the resistance value and the like, and appropriately selected by a person skilled in the art. As the temperature is the effective factor accelerating the oxidation of the metal material, the higher the temperature, the higher the water vapor pressure. Therefore, the contact time and contact content between the metal material and $H_2O$ may be increased to cause the faster oxidation of the metal material. Accordingly, the resistance value of the metal material may depend on change in the temperature. Therefore, when the predetermined resistance value is calculated based on the environmental information including the temperature, it is possible to operate the system using the voltage closer to the required minimum resistance value in which the metal material is prevented from being corroded.

As a specific example, when the received pH value exceeds a predetermined pH value, the voltage control unit may use a corrected predetermined resistance value in which the pH value reflects the predetermined resistance value. Here, the predetermined pH value may refer to a minimum value that may substantially affect prevention of the corrosion of the canister caused by the significant oxidation. This value may be calculated based on the database including the surrounding environment, the voltage applied value, the resistance value and the like, and appropriately selected by a person skilled in the art. As the pH is another effective factor accelerating the oxidation of the metal material, the oxidation of the metal material may be accelerated or slowed depending on the range of the surrounding pH. Accordingly, the resistance value of the metal material may significantly depend on change in the surrounding pH. Therefore, when the predetermined resistance value is calculated based on the environmental information including the surrounding pH, it is possible to operate the system using the voltage closer to the required minimum resistance value in which the metal material is prevented from being corroded. The pH may refer to the pH of the surroundings including liquid, solid or gas, existing outside the canister, and may indicate the pH of the basement soil in contact with the outer surface of the canister when the canister is buried in the basement.

As described above, the predetermined resistance value may be set based on the data obtained by statistically calculating both the environmental information such as the humidity value, the temperature value and the pH value, and change in the resistance value depending on the environmental information. This predetermined resistance value may be a value more than zero, and may be set to be in an appropriate range in which the canister is prevented from being corroded by the oxidation.

The external server unit may receive any one or two or more environmental information selected from the resistance value, the humidity value, the temperature value, the pH value or the like from the voltage control unit and/or the applied voltage value from the unit canister. Here, the external server unit may construct the database by accumulating and storing each value, and statistically calculate the stored values to control the voltage control unit.

In an exemplary embodiment of the present disclosure, the external server unit may preferably apply an average voltage value calculated from the database obtained from the existing canister to an initial applied voltage value of the installed unit canister or the newly-installed unit canister. In this manner, the voltage actually close to the required minimum applied voltage value may be applied to the installed unit canister or the newly-installed unit canister. In more detail, the external server unit may receive each value from each voltage control unit of the plurality of unit canisters positioned at different places, may store the average voltage value obtained by statistically calculating the applied voltage values of the unit voltage control units of respective places, and may control the voltage control unit to apply the average voltage value to the initial applied voltage value of the installed unit canister or the newly-installed unit canister. This manner may make it easy to operate a large-scale system as described below. In addition, also when the unit canister is installed or is to be installed in a new place at which the canister has yet to be installed, it is possible to construct the database of the place afterwards while effectively and efficiently operating the canister even though the database including the environmental information on the corresponding place is not initially constructed.

As shown in FIG. 6, the external server unit may control the voltage control unit to collectively apply the same voltage having the average voltage value to the new unit canisters at a predetermined time, in which calculation of the average voltage value is already completed based on the database. Therefore, the first logical operation does not need to be calculated at each voltage control unit for each unit canister in real time, which may be suitable to operate the large-scale system without consuming large energy until a particular problem occurs in the specific unit canister.

However, the oxidation of the canister may be accelerated as its surrounding environment is changed if the particular problem occurs in the specific unit canister, i.e., if there occurs the problem that the first logical operation comparing the resistance value with the predetermined resistance value is not continuously performed. Therefore, if only the average voltage value is continuously applied to the canister, the corrosion of the unit canister may proceed.

In addition, as the number of canisters is increased, for example, when there is a need to operate the large-scale system including hundreds or thousands of canisters, the energy consumption required for performing the first logical operation on each unit canister may also be increased and the operation of the canister may become complex.

Therefore, the method for preventing corrosion of a spent nuclear fuel canister according to the second aspect may also provide a method to solve the problem that the first logical operation is not continuously performed, and to make the canisters to be more easily operated on a large scale, that is, to continuously operate the system by having the appropriate minimum resistance value and to simultaneously significantly reduce the energy consumption required for the first logical operation on each unit canister.

The method for preventing corrosion of a spent nuclear fuel canister according to a second aspect may include an external server that receives the information from the voltage control unit and stores the average voltage value obtained by statistically calculating respective applied voltage values applied to the unit canisters, wherein the external server unit may control the voltage control unit to make the applied voltage value applied to the installed unit canister or the unit canister installed in a new place be the average voltage value, and may perform a second logical operation in which the voltage control unit is controlled to stop the first logical operation when an increase rate of the resistance value of the unit canister is less than or equal to a predetermined increase rate of the resistance value, and the voltage control unit is controlled to perform the first logical operation again when the increase rate of the resistance value is more than the predetermined increase rate of the resistance value.

Here, the predetermined increase rate of the resistance value may be a value more than zero, and may be set to be in an appropriate range in which the canister is prevented from being corroded by the oxidation. In detail, when the resistance value of the metal material of the canister is increased beyond a predetermined error range, i.e., the increase rate of the resistance value has a positive value, this increase may indicate a situation in which the oxidation of the metal material may occur. Therefore, by checking change in the increase rate of the resistance value of the metal material of the unit canister, the external server unit may allow the voltage to be selectively applied to only a small number of canisters that cause the problem, while maintaining the same voltage to be applied to the plurality of canisters.

In detail, as shown in FIG. 7, as long as the increase rate of the resistance value of the unit canister is not significantly changed, the external server unit does not need not to continuously perform the first logical operation on the unit voltage control unit of the unit canister. Therefore, the external server unit may allow the average voltage value which is the same voltage to be collectively applied to the unit canisters. Accordingly, the external server unit not only may efficiently operate the large-scale system, but also may selectively check a case where a problem occurs in real time. That is, each of the numerous voltage control units may not continuously perform the first logical operation, and the external server unit may control whether the voltage control unit performs the first logical operation or not through the second logical operation. In this manner, the external server unit may repeat the second logical operation, thereby allowing the first logical operation to be performed again only for the unit canister in which the problem occurs. In addition, when the voltage control unit of the unit canister in which the problem occurs repeatedly performs the first logical operation, the external server unit may suspend the second logical operation on the unit canister in which the problem occurs. Further, when the database is constructed by sufficiently ensuring the environmental information and the voltage value from the unit canister in which the problem occurs, it is possible to stop the first logical operation and perform the suspended second logical operation again. Through the deep learning in which the data including each value is accumulated by repeatedly performing this process, it is possible to operate all the canisters more stably, effectively and efficiently.

Furthermore, according to a second aspect, the method of installing a spent nuclear fuel canister in a new place described above may more easily construct the database of the place afterwards while operating the canister more effectively and efficiently even though the database is not initially constructed.

DESCRIPTION OF REFERENCE NUMERALS

- 110: external protection canister, 111 external opening and closing portion,
- 120: internal canister, 121: internal opening and closing portion,
- 122: partition wall

The invention claimed is:

1. A method for preventing corrosion of a spent nuclear fuel canister by using electrolytic corrosion protection, comprising:

connecting a sacrificial anode portion to a nuclear fuel storage portion storing a spent nuclear fuel therein and including a unit canister made of metal material including at least one selected from copper and iron, to prevent corrosion of the unit canister;

the sacrificial anode portion connected to the canister including magnesium metal, and further comprising applying a voltage from a power supply to the unit canister as an applied voltage value.

2. The method for preventing corrosion of a spent nuclear fuel canister by using electrolytic corrosion protection of claim 1, wherein the unit canister includes: an external protection canister made of copper metal material; and an internal canister made of iron metal material, positioned inside the external protection canister, and including a spent nuclear fuel accommodation space.

3. The method for preventing corrosion of a spent nuclear fuel canister by using electrolytic corrosion protection of claim 2, wherein the external protection canister has a thickness of 5 mm or more.

4. The method for preventing corrosion of a spent nuclear fuel canister by using electrolytic corrosion protection of claim 1, further comprising a predicting step of predicting a magnesium content the unit canister needs, a time to replace the magnesium of the unit canister, or an anti-corrosion period of the unit canister, wherein the predicting is performed based on values stored in an external server unit constructing a database by accumulating and storing one or more values selected from the resistance value, humidity value, temperature value and pH value of the unit canister.

5. The method for preventing corrosion of a spent nuclear fuel canister by using electrolytic corrosion protection of claim 4, wherein the nuclear fuel storage portion is buried in a basement, and the sacrificial anode portion is positioned in a place where the magnesium metal is able to be replaced, and positioned to be spaced apart from or adjacent to the unit canister.

6. The method for preventing corrosion of a spent nuclear fuel canister by using electrolytic corrosion protection of claim 5, comprising:

a metal oxidation content monitoring step of measuring a consumption content of the magnesium metal in the sacrificial anode portion; and a replacement time calculating step of predicting the time to replace the magnesium metal based on information obtained from the metal oxidation content monitoring step and the predicting step.

7. The method for preventing corrosion of a spent nuclear fuel canister by using electrolytic corrosion protection of claim 6, further comprising a step of replacing magnesium metal based on the information on the time to replace the magnesium metal, which is obtained from the replacement time calculating step.

8. The method for preventing corrosion of a spent nuclear fuel canister by using electrolytic corrosion protection of claim 4, further comprising a checking step of checking whether an error occurs from an electric method applied to the unit canister based on change in the resistance value, the resistance value being included in the values stored in the external server unit in the predicting step.

9. The method for preventing corrosion of a spent nuclear fuel canister by using electrolytic corrosion protection of claim 4, comprising:

a resistance measuring unit measuring the resistance value of the unit canister; and a resistance receiving unit receiving the resistance value from the resistance measuring unit in real time, wherein the external server unit receives the resistance value from the resistance receiving unit.

10. The method for preventing corrosion of a spent nuclear fuel canister by using electrolytic corrosion protection of claim 4, comprising:

a humidity measuring unit measuring the humidity value of the unit canister; and a humidity receiving unit receiving the humidity value from the humidity measuring unit in real time, wherein the external server unit receives the humidity value from the humidity receiver.

11. The method for preventing corrosion of a spent nuclear fuel canister by using electrolytic corrosion protection of claim 4, comprising:

a temperature measuring unit measuring the temperature value of the unit canister; and a temperature receiving unit receiving the temperature value from the temperature measuring unit in real time, wherein the external server unit receives the temperature value from the temperature receiving unit.

12. The method for preventing corrosion of a spent nuclear fuel canister by using electrolytic corrosion protection of claim 4, comprising:

a pH measuring unit measuring the pH value of the unit canister; and a pH receiving unit receiving the pH value from the pH measuring unit in real time, wherein the external server unit receives the pH value from the pH receiving unit.

13. The method for preventing corrosion of a spent nuclear fuel canister by using electrolytic corrosion protection of claim 1, further comprising a voltage control unit performing a first logical operation in which the applied voltage value is increased when the resistance value of the unit canister is more than a predetermined resistance value, and the applied voltage value is decreased when the resistance value is less than the predetermined resistance value.

14. The method for preventing corrosion of a spent nuclear fuel canister by using electrolytic corrosion protection of claim 13, comprising an external server unit receiving the information from the voltage control unit, and storing an average voltage value obtained by statistically calculating the respective applied voltage values applied to the unit canisters, wherein the external server unit controls the voltage control unit to apply the average voltage value to the installed unit canister or the unit canister installed in a new place be the average voltage value, and performs a second logical operation in which the voltage control unit is controlled to stop the first logical operation when an increase rate of the resistance value of the unit canister is less than or equal to a predetermined increase rate of the resistance value, and the voltage control unit is controlled to perform the first logical operation again when the increase rate of the resistance value is more than the predetermined increase rate of the resistance value.

* * * * *